UNITED STATES PATENT OFFICE.

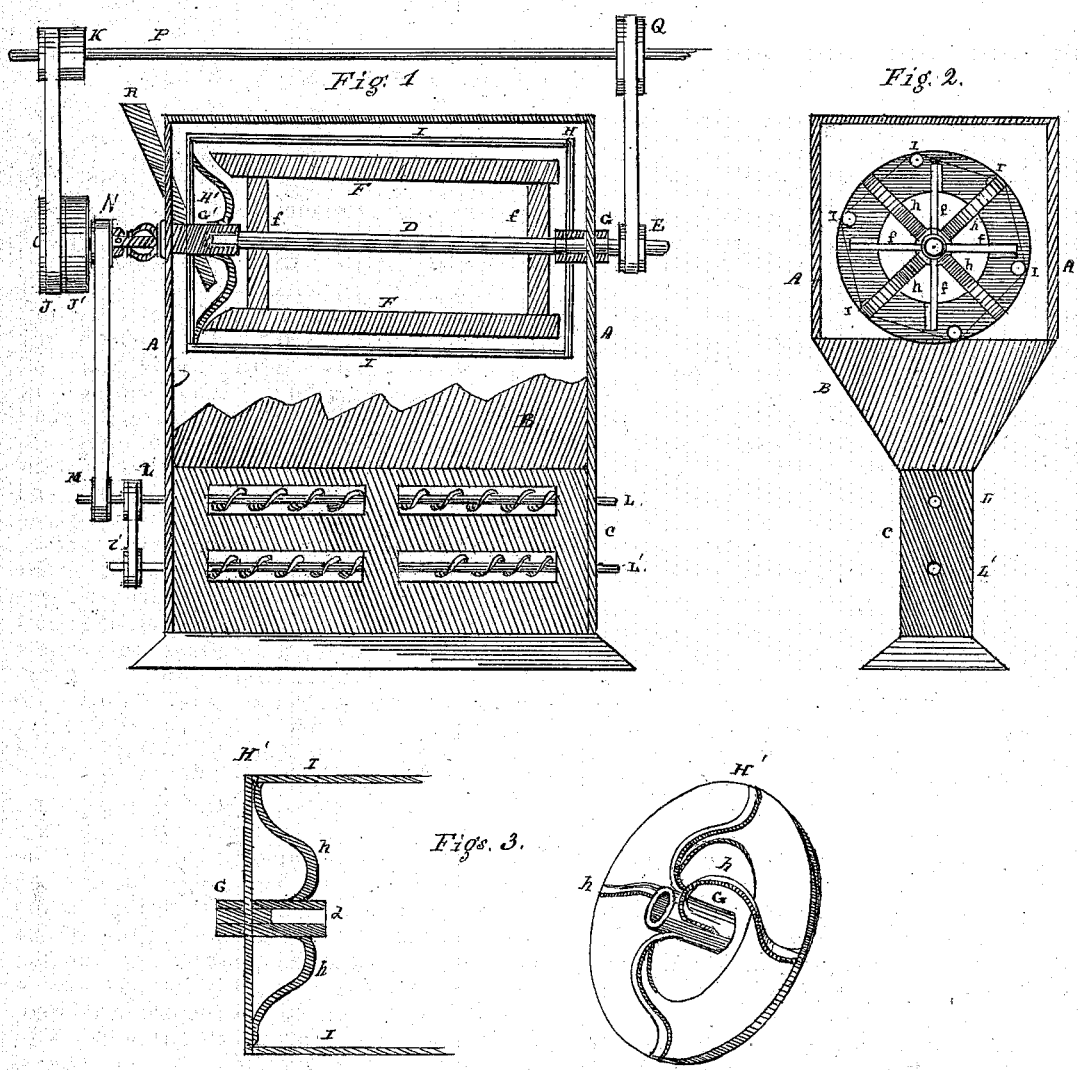

EPHRAIM D. AUCHEY, OF MANHEIM, ASSIGNOR TO HIMSELF AND FRANCIS J. MARTIN, OF LANCASTER, PENNSYLVANIA.

IMPROVEMENT IN FLOUR-BOLTS.

Specification forming part of Letters Patent No. 115,412, dated May 30, 1871.

*To all whom it may concern:*

I, EPHRAIM D. AUCHEY, of Manheim, in the county of Lancaster and State of Pennsylvania, have invented certain Improvements in Flour-Bolts for cooling the flour and facilitating the bolting and protecting the bolting-cloth, which the following is a specification:

The first part of my invention relates to the combination of the reel-heads on hollow gudgeons or sleeves, and peculiarly-curved spokes at the feed end. The second part of my invention consists of a fan within the reel or bolt its entire length, the shaft of which has its bearings in the hollow gudgeons of the reel and an independent gear, so as to run it in the same or reverse direction of the reel at any desired speed and keep it in motion, while the reel is at rest, for the threefold purpose of cooling the flour, to bolt faster by keeping the meshes open, and to keep up its motion to prevent beetles or the meal-bug from perforating the cloth, giving them no rest unless they escape with the tailings. The damage done is usually when the bolt is at rest; but by keeping up the motion of the fan the insects are kept in a constant whirl-round by the powerful air-current induced.

The accompanying drawing illustrates my invention, in which Figure 1 is a side elevation of an ordinary bolting-chest and conveyers, with my improvements in place; Fig. 2 is an end view of the same; Figs. 3, the front head in section and perspective of the reel, shown separately.

A brief explanation will enable any one skilled in the art to make and use my invention.

Figures 1 and 2 show an ordinary bolting-chest, A, hopper B, conveyers $c$, on shafts L L', with their pulleys $l\ l$ M. Instead of an ordinary reel for the bolt, with its shaft solid, I have the front head H' cast with the spokes $h$, curved and connected with a sleeve or hollow gudgeon, G, forming the hub, leaving an open center through the head in an ordinary way for the feed-pipe or trough R to enter the bolt, the curved spokes giving the necessary space. The head at the other end H has also a hollow axis. Both heads are connected with the ordinary ribs I. I use gas-pipe wrapped with paper or muslin as the best adapted or most convenient. The reel-shaft or gudgeon G has at one end the ordinary coupling O, with the same extended for the double pulley J J to shift off and on, and pulley N for driving the conveyers by the ordinary belting, not shown, nor the main-line shaft P, with its pulley K, to drive the reel and pulley Q, which drives the fan. The fan-shaft D enters into and has its bearings in the hollow gudgeons of the reel-heads H, and extends through the one where it has a strap-pulley, E, or cog-gear, and receives motion from the main-line shaft, or otherwise, independent of the motions of the reel. This fan has the ordinary wings F and spiders or spokes $f$, and revolves in close contact with the bolting-cloth within the bolt its entire length, as shown. The speed of the fan is determined by the size of the pulley: say, a forty-inch pulley on the main-line shaft to a ten-inch pulley on the fan-shaft, while a twenty-inch pulley in like manner, by strap, connected with the coupling of the reel-gudgeon with two thirty-inch pulleys to shift on and off, would give about the relative speed of motion between the reel and fan within it. Thus it will be seen that the reel or bolting can be stopped at pleasure, while the fan keeps in constant rapid motion within the bolt, thereby not only keeping or opening the meshes of the cloth, but preventing insects from settling on the outside or inside of the cloth, and consequently protects this valuable fabric against the ravages of insects known to infest mills. The fan, as before intimated, is of the greatest efficacy in bolting, so as to require less surface, cooling the flour, and to prevent clogging, besides saving a great expense in bolting-cloths annually. It may be well to state that in long bolts one or more rings may be fixed around the arms I of the reel intermediate between the external heads H' H to give additional support.

I am aware that fans are used in various ways in the process of bolting flour and for various objects; but I am not aware of a fan made to revolve within the reel of a bolt with an independent motion on its own shaft and gear, so as to reverse its motion or to give any amount of speed, while the reel has its ordinary speed and motion, and may rest while the fan within it keeps in motion.

The same arrangement of the fan, and with another cloth, will answer for scouring; therefore,

What I claim is—

1. The arrangement of a reel-head, H', with its curved arms or spokes $h$, hollow gudgeons G', in combination with the ribs I and head H with its hollow gudgeon G, all substantially made in the manner and for the purpose specified.

2. In combination with the hollow gudgeons G' G of the reel, the arrangement of the fan-shaft D, wings F, spider or arms $f$, and pulley E or its equivalent, for imparting motion to a fan when said fan is within the reel of a flour-bolt, substantially in the manner shown, and for the purpose set forth.

EPHRAIM D. AUCHEY.

Witnesses:
  WM. B. WILEY,
  JACOB STAUFFER.